US010625700B2

(12) United States Patent
Mummigatti et al.

(10) Patent No.: US 10,625,700 B2
(45) Date of Patent: Apr. 21, 2020

(54) AIRBAG PROTECTION SYSTEM FOR VEHICLE BATTERY PACKS

(71) Applicant: GM GLOBAL TECHNOLOGY OPERATIONS LLC, Detroit, MI (US)

(72) Inventors: Mahesh Mummigatti, Bangalore (IN); Tejas R. Bhavsar, Troy, MI (US); Sriram Seshadri, Bangalore (IN)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 97 days.

(21) Appl. No.: 15/718,108

(22) Filed: Sep. 28, 2017

(65) Prior Publication Data

US 2019/0092262 A1 Mar. 28, 2019

(51) Int. Cl.
| | |
|---|---|
| *B60R 21/20* | (2011.01) |
| *B60L 50/60* | (2019.01) |
| *B60K 1/04* | (2019.01) |
| *B60K 6/28* | (2007.10) |
| *B60R 21/0132* | (2006.01) |

(Continued)

(52) U.S. Cl.
CPC ............... *B60R 21/20* (2013.01); *B60K 1/04* (2013.01); *B60K 6/28* (2013.01); *B60L 50/66* (2019.02); *B60K 2001/0427* (2013.01); *B60R 21/0132* (2013.01); *B60R 2021/01013* (2013.01); *B60R 2021/23107* (2013.01); *B60Y 2200/91* (2013.01); *B60Y 2200/92* (2013.01); *B60Y 2400/112* (2013.01); *B60Y 2400/3042* (2013.01); *Y10S 903/907* (2013.01)

(58) Field of Classification Search
CPC .......... B60R 21/20; B60R 2021/01013; B60R 21/0132; B60R 2021/23107; B60K 6/28; B60K 2001/0427; B60Y 2400/3042; B60Y 2400/112; B60Y 2200/92; B60Y 2200/91; Y10S 903/907
See application file for complete search history.

(56) References Cited

U.S. PATENT DOCUMENTS 5,251,931 A * 10/1993 Semchena ............. B60R 21/207
280/730.1
5,333,899 A * 8/1994 Witte ................ B60R 21/23138
280/728.1

(Continued)

FOREIGN PATENT DOCUMENTS

| | | |
|---|---|---|
| CN | 105609682 A | 5/2016 |
| GB | 2537859 A | 2/2016 |
| KR | 20130110386 A | 10/2013 |

*Primary Examiner* — Darlene P Condra

(57) ABSTRACT

A vehicle includes a first seat and a second seat occupying a vehicle body, a battery pack disposed between the first seat and the second seat, a first inboard airbag, and a second inboard airbag, and optionally a first outboard airbag and a second outboard airbag. The airbags are deployable from a packed position to or between an inflated position. The first inboard airbag is configured to deploy and occupy a space between the first seat and the battery pack, the first outboard airbag is configured to deploy and occupy a space between the first seat and the first side of the vehicle body, the second inboard airbag is configured to deploy and occupy a space between the second seat and the battery pack, and the second outboard airbag is configured to deploy and occupy a space between the second seat and the second side of the vehicle body.

12 Claims, 3 Drawing Sheets

(51) Int. Cl.
  *B60R 21/01* (2006.01)
  *B60R 21/231* (2011.01)

(56) References Cited

U.S. PATENT DOCUMENTS

| | | | | |
|---|---|---|---|---|
| 5,492,361 A | * | 2/1996 | Kim | B60R 21/02 |
| | | | | 280/730.1 |
| 5,536,038 A | * | 7/1996 | Bollaert | B60R 21/23 |
| | | | | 280/730.2 |
| 5,542,696 A | * | 8/1996 | Steffens, Jr. | B60R 21/207 |
| | | | | 280/730.1 |
| 5,630,616 A | * | 5/1997 | McPherson | B60R 21/207 |
| | | | | 280/728.2 |
| 5,678,852 A | * | 10/1997 | Brown | B60R 21/207 |
| | | | | 280/730.2 |
| 8,882,138 B1 | * | 11/2014 | Hicken | B60R 21/231 |
| | | | | 280/730.1 |
| 2004/0232672 A1 | * | 11/2004 | Bandoh | B60N 3/101 |
| | | | | 280/735 |
| 2007/0233919 A1 | * | 10/2007 | Miura | H04L 12/40013 |
| | | | | 710/110 |
| 2008/0061538 A1 | * | 3/2008 | Mohammad | B60R 21/207 |
| | | | | 280/730.2 |
| 2008/0129024 A1 | * | 6/2008 | Suzuki | B60R 21/23138 |
| | | | | 280/734 |
| 2009/0183935 A1 | * | 7/2009 | Tsuchiya | B60K 1/04 |
| | | | | 180/68.1 |
| 2009/0315359 A1 | * | 12/2009 | Suzuki | B60K 1/04 |
| | | | | 296/64 |
| 2010/0001553 A1 | * | 1/2010 | Yoda | B60K 1/04 |
| | | | | 296/193.07 |
| 2010/0078921 A1 | * | 4/2010 | Ryan | B60R 21/207 |
| | | | | 280/730.2 |
| 2012/0091697 A1 | * | 4/2012 | Wiik | B60R 21/23138 |
| | | | | 280/730.2 |
| 2013/0221640 A1 | * | 8/2013 | Gwon | B60R 21/231 |
| | | | | 280/730.2 |
| 2014/0151984 A1 | * | 6/2014 | Fukawatase | B60R 21/233 |
| | | | | 280/730.2 |
| 2014/0345961 A1 | * | 11/2014 | Kimura | B60K 1/04 |
| | | | | 180/68.5 |
| 2016/0144818 A1 | * | 5/2016 | Mihm | B60R 21/231 |
| | | | | 280/730.2 |
| 2016/0159307 A1 | * | 6/2016 | Fujiwara | B60R 21/207 |
| | | | | 280/729 |
| 2016/0200278 A1 | * | 7/2016 | Wiik | B60R 21/23138 |
| | | | | 280/729 |
| 2017/0043741 A1 | * | 2/2017 | Kobayashi | B60N 2/42 |
| 2017/0232922 A1 | * | 8/2017 | Wiik | B60R 21/23138 |
| | | | | 280/730.2 |
| 2017/0274863 A1 | * | 9/2017 | Mihm | B60R 21/2346 |
| 2017/0291567 A1 | * | 10/2017 | Koike | B60R 21/207 |
| 2017/0327058 A1 | * | 11/2017 | Takezawa | B60K 1/04 |
| 2018/0111469 A1 | * | 4/2018 | Laimboeck | B60K 6/26 |
| 2018/0224130 A1 | * | 8/2018 | Lee | F24C 15/00 |
| 2018/0354438 A1 | * | 12/2018 | Baccouche | B60K 1/04 |

* cited by examiner

AIRBAG PROTECTION SYSTEM FOR VEHICLE BATTERY PACKS

BACKGROUND

Many types of vehicles employ battery packs for propulsion purposes. Battery packs can be prone to damage during traumatic events, such as vehicle collisions.

SUMMARY

Provided is a vehicle including a vehicle body defining a cabin and having a first side and a second side, a first seat and a second seat disposed within the cabin, wherein each of the first seat and the second seat include an inboard side and an outboard side and the first seat can be biased towards the first side of the vehicle and the second seat can be biased towards the second side of the vehicle, a battery pack disposed at least partially between the first seat and the second seat, a first inboard airbag, a first outboard airbag, a second inboard airbag, and a second outboard airbag. The first inboard airbag, the first outboard airbag, the second inboard airbag, and the second outboard airbag can be each deployable from a packed position to or between an inflated position, and the first inboard airbag can be configured to deploy and occupy a space at least partially between the first seat and the battery pack, the first outboard airbag can be configured to deploy and occupy a space at least partially between the first seat and the first side of the vehicle body, the second inboard airbag can be configured to deploy and occupy a space at least partially between the second seat and the battery pack, and the second outboard airbag can be configured to deploy and occupy a space at least partially between the second seat and the second side of the vehicle body. The first inboard airbag can be disposed on or in the first seat, the first outboard airbag can be disposed on or in the first seat, the second inboard airbag can be disposed on or in the second seat, and/or the second outboard airbag can be disposed on or in the second seat. The first inboard airbag, the first outboard airbag, the second inboard airbag, and the second outboard airbag can be each deployable from a packed position to or between an inflated position, and the first inboard airbag can be configured to deploy and occupy a space at least partially between the first seat and the battery pack, the first outboard airbag can be configured to deploy and occupy a space at least partially between the first seat and the first side of the vehicle body, the second inboard airbag can be configured to deploy and occupy a space at least partially between the second seat and the battery pack, and the second outboard airbag can be configured to deploy and occupy a space at least partially between the second seat and the second side of the vehicle body. The vehicle can further include a first sensor disposed proximate the first seat outboard side and a second sensor disposed proximate the second seat outboard side. The first sensor and the second sensor each are an accelerometer. The first inboard airbag, the first outboard airbag, the second inboard airbag, and the second outboard airbag each include an actuator, and each respective actuator can be operatively connected with at least one of the first sensor and the second sensor. The first inboard airbag actuator, the first outboard airbag actuator, the second inboard airbag actuator, and the second outboard airbag actuator can be operatively connected with at least one of the first sensor and the second sensor via an electronic control module. The vehicle can be an electric vehicle or hybrid electric vehicle at least partially powered by the battery pack.

Also provided is a vehicle including a first seat and a second seat, wherein each of the first seat and the second seat include an inboard side and an outboard side, a battery pack disposed at least partially between the first seat and the second seat, a first inboard airbag, and a second inboard airbag. The first inboard airbag and the second inboard airbag can be each deployable from a packed position to or between an inflated position, and the first inboard airbag can be configured to deploy and occupy a space at least partially between the first seat and the battery pack and the second inboard airbag can be configured to deploy and occupy a space at least partially between the second seat and the battery pack. The vehicle can further include a first outboard airbag disposed on or proximate to the outboard side of the first seat, and a second outboard airbag disposed on or proximate to the outboard side of the second seat. Each of the first inboard airbag and the second inboard airbag can be configured to deploy in response to a deployment event. The deployment event can be a collision. The deployment event can be an imminent collision. The first inboard airbag, the first outboard airbag, the second inboard airbag, and the second outboard airbag can be configured to deploy simultaneously in response to a deployment event.

Also provided is a vehicle including a vehicle body defining a cabin and having a first side and a second side, a first seat and a second seat disposed within the cabin and generally transverse a direction of movement of the vehicle, wherein each of the first seat and the second seat include an inboard side and an outboard side, a battery pack disposed at least partially between the first seat and the second seat and configured to deliver power to a driveline of the vehicle, a first sensor disposed proximate the first seat outboard side, a second sensor disposed proximate the second seat outboard side, an electronic control module (ECM) operatively connected to the first sensor and the second sensor, a first inboard airbag disposed between the first seat and the battery pack and including an actuator operatively connected to the ECM, a first outboard airbag disposed between the first seat and the vehicle body and including an actuator operatively connected to the ECM, a second inboard airbag disposed between the second seat and the battery pack and including an actuator operatively connected to the ECM, and a second outboard airbag disposed between the second seat and the vehicle body and including an actuator operatively connected to with the ECM. The first inboard airbag and the second inboard airbag can be capable of deploying to a position contiguous with the battery pack. One or more of the first inboard airbag, the first outboard airbag, the second inboard airbag, and the second outboard airbag can be configured to deploy in response to a deployment event. The occurrence of a deployment event can be determined by the ECM based on one or more signals received from the first sensor and/or the second sensor. The first sensor and the second sensor each can be an accelerometer. The first inboard airbag and the first outboard airbag can be mounted to a base of the first seat, and the second inboard airbag and the second outboard airbag can be mounted to a base of the second seat.

Although many of the embodiments herein are described in relation to automobiles, the embodiments herein are generally suitable for all vehicles utilizing battery packs.

Other objects, advantages and novel features of the exemplary embodiments will become more apparent from the following detailed description of exemplary embodiments and the accompanying drawings.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Generally, this disclosure pertains to vehicles utilizing airbag protection systems for protecting one or more battery packs of the vehicle. Vehicles can include electrical vehicles (BEV), and hybrid electric vehicles (HEV), plug-in hybrid electric vehicles (PHEV), extended-range electric vehicles (EREV), two-mode hybrids, full hybrids, power-assist hybrids, mild hybrids, series hybrids, parallel hybrids, series-parallel hybrids, power-split hybrids, belted alternator starter vehicles (BAS), and BAS-plus hybrids, among others, which are known in the art. In some specific embodiments, the vehicle comprises an automobile. In such an embodiment, the one or more battery packs and power a vehicle driveline, for example.

Figure 1:
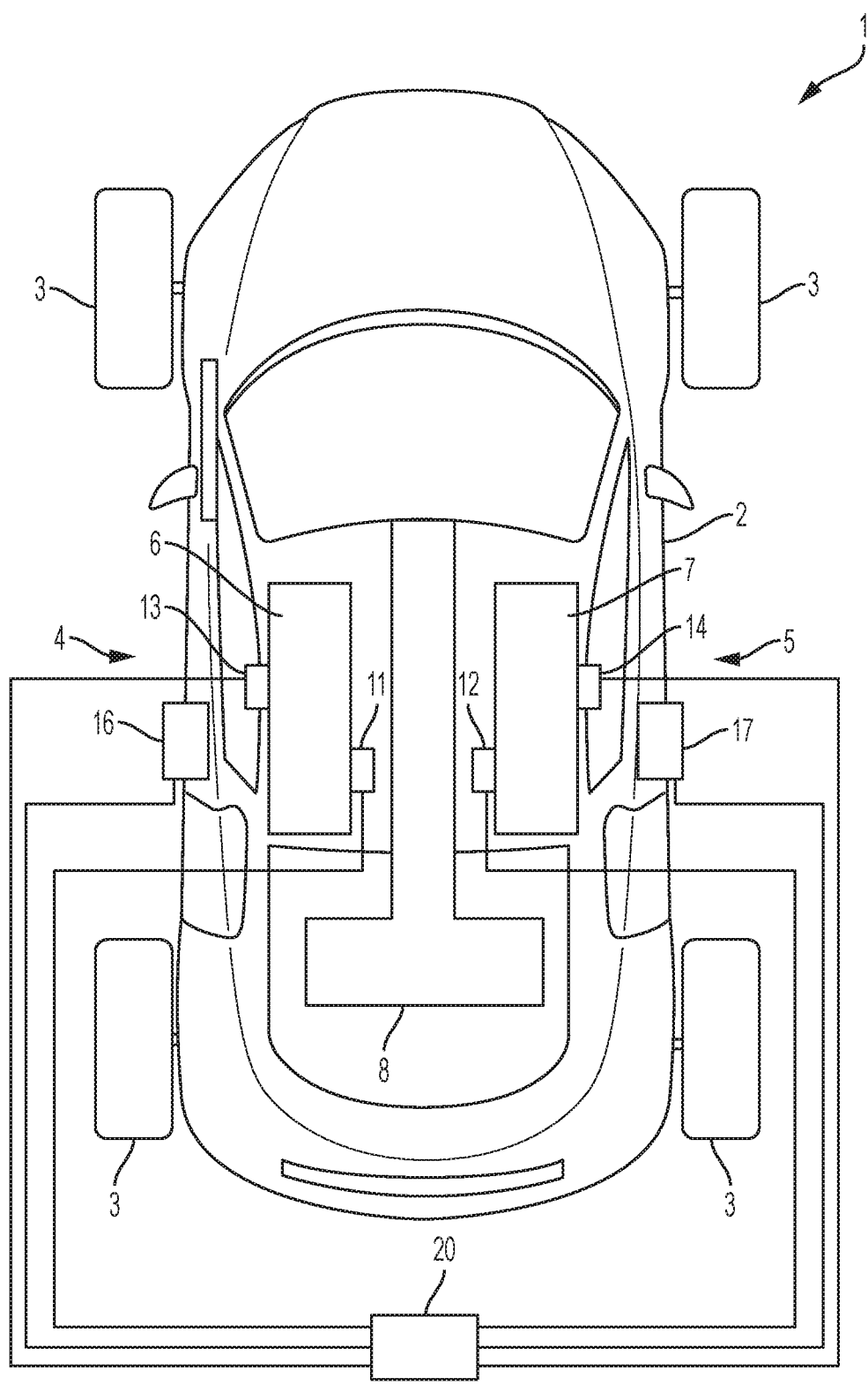
FIG. 1 illustrates a block diagram of a vehicle, according to one or more embodiments.
Figure 2:
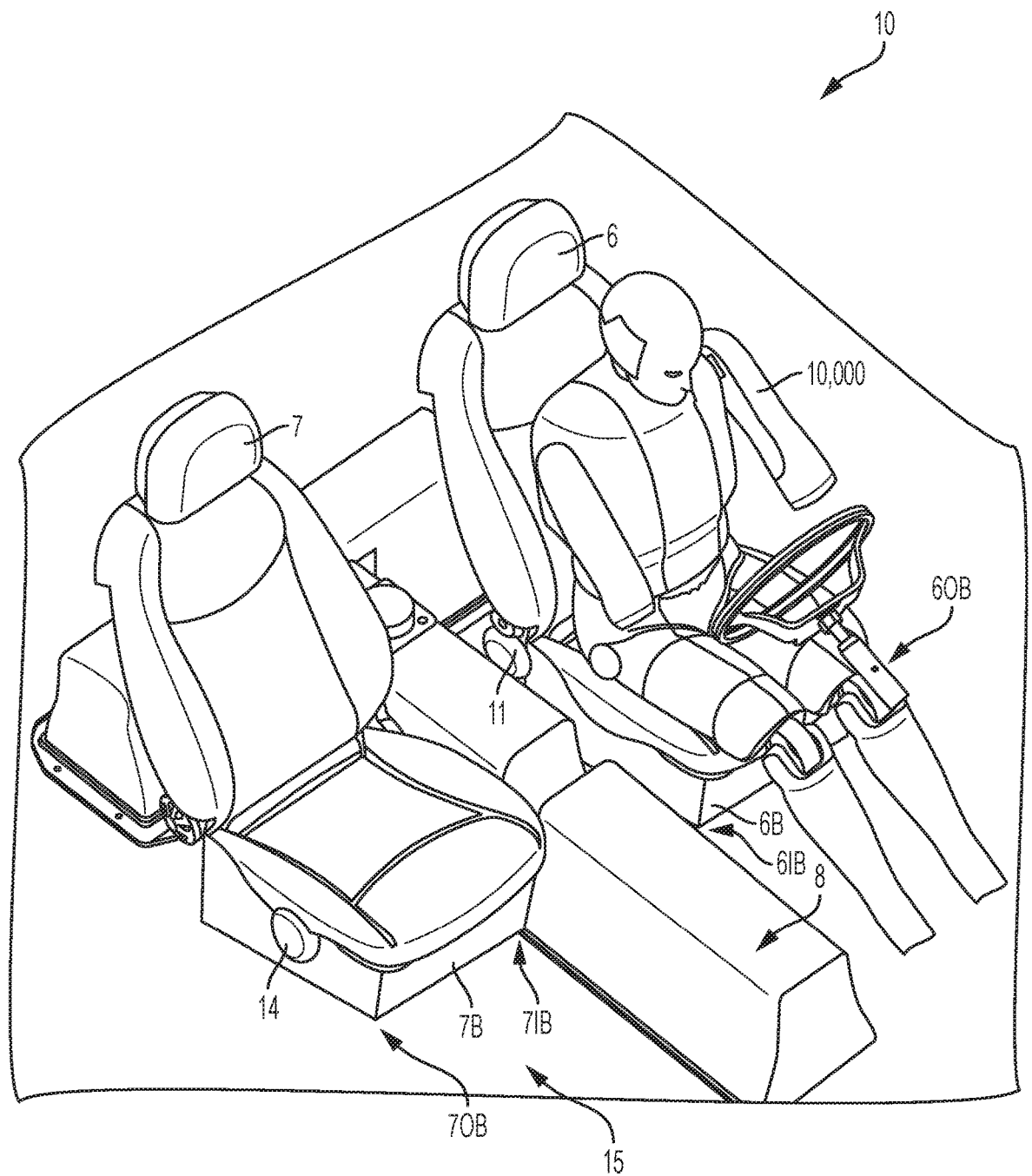
FIG. 2 illustrates a perspective view of a vehicle interior, according to one or more embodiments.
Figure 3:
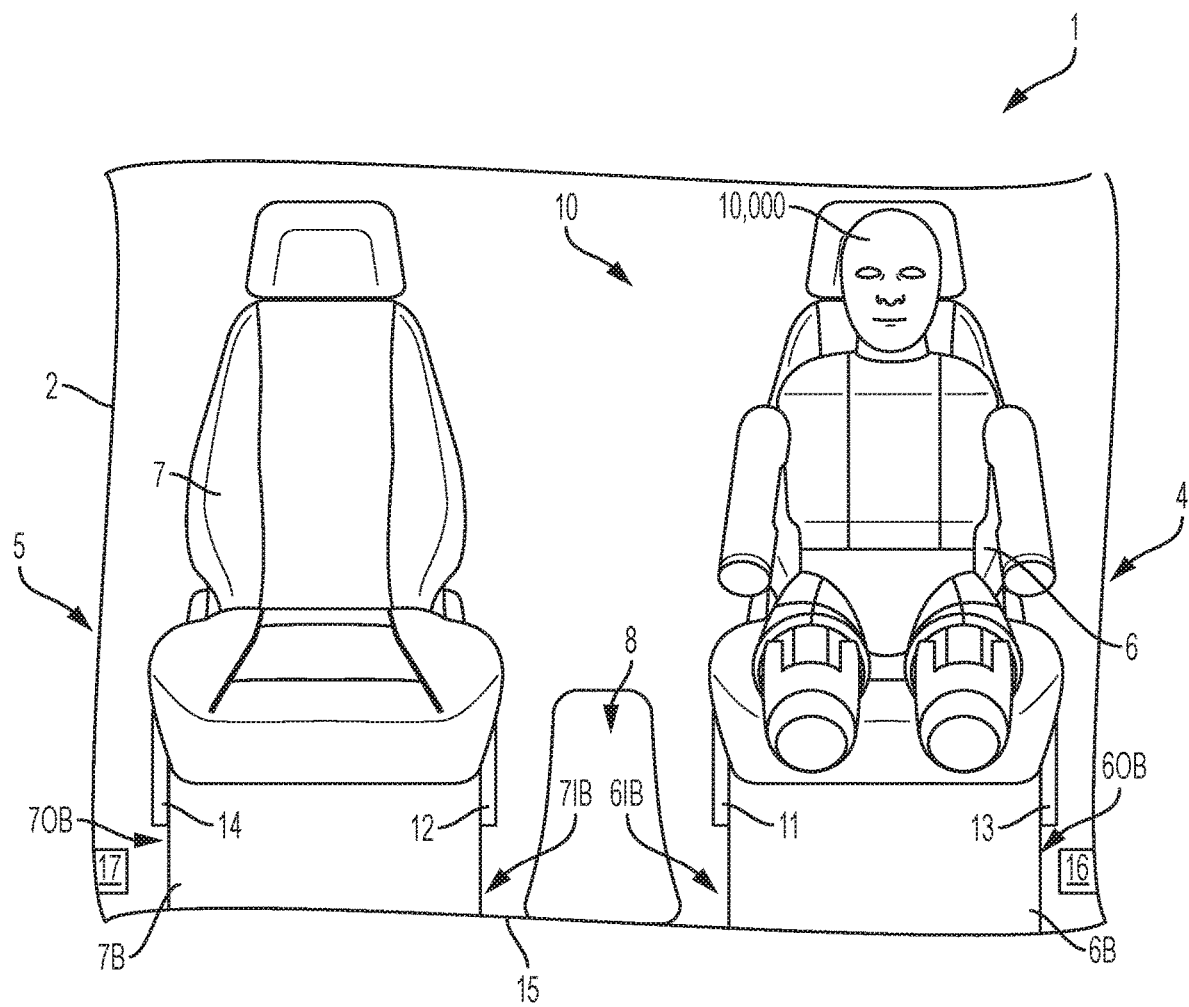
FIG. 3 illustrates a front view of the interior of a vehicle, according to one or more embodiments.

FIG. 1 illustrates a block diagram of a vehicle 1 generally including a body 2, a plurality of wheels 3, a first side 4 (e.g., the driver side), and a second side 5 (e.g., the passenger side). The body 2 can define a vehicle cabin in which a first seat 6 and a second seat 7 occur. First seat 6 and second seat 7 can be disposed generally transverse to one or more directions of travel of the vehicle (e.g., forward or reverse), for example. In other words, first seat 6 is biased towards first side 4 of vehicle 1 and second seat 7 is biased towards second side 5 of vehicle 1. A battery pack 8 is disposed at least partially between first seat 6 and second seat 7. FIG. 2 illustrates a perspective view of an interior 10 (i.e., the cabin) of the vehicle 1, which can accommodate one or more passengers. For example, a driver 10,000 is shown occupying the first seat 6. Similarly, FIG. 3 illustrates a front view of the interior 10 of vehicle 1. Each of the first seat 6 and the second seat 7 have a base 6B and 7B, respectively, an inboard side 6IB and 7IB, respectively, and an outboard side 60B and 70B, respectively. Bases 6B and 7B extend above a floor 15 of the interior 10, and can define a height of each respective seat. Battery pack 8 similarly extends above floor 15, and occurs at least partially within the height of first seat 6 and second seat 7. A portion of first seat 6 and/or second seat 7 may optionally be contiguous with battery pack 8. However, a space is present between both battery pack 8 and inboard side 7IB of second seat 7 and battery pack 8 and inboard side 6IB of second seat 6. Battery pack 8 can include one or a plurality of individual battery cells which can be sensitive to impacts and sudden deceleration.

Vehicle 1 further comprises a first inboard airbag 11 disposed between first seat 6 and battery pack 8, and a second inboard airbag 12. First inboard airbag 11 and the second inboard airbag 12 are each deployable from a packed position to or between an inflated (i.e., deployed) position. First inboard airbag 11 is configured to deploy and occupy a space at least partially between first seat 6 and battery pack 8. First inboard airbag 11 accordingly is disposed within vehicle 1 in its packed position in order to accommodate such a deployment capability. For example, first inboard airbag 11 can be disposed on floor 15, within floor 15, on base 6B, within base 6B, proximate to base 6B, and/or between first seat 6 and battery pack 8. Upon deployment, first inboard airbag 11 may achieve contiguity with battery pack 8. Similarly, second inboard airbag 12 is configured to deploy and occupy a space at least partially between second seat 7 and battery pack 8. Second inboard airbag 12 accordingly is disposed within vehicle 1 in its packed position in order to accommodate such a deployment capability. For example, second inboard airbag 12 can be disposed on floor 15, within floor 15, on base 7B, within base 7B, proximate to base 7B, and/or between second seat 7 and battery pack 8. Upon deployment, second inboard airbag 12 may achieve contiguity with battery pack 8.

Vehicle 1 may further comprise a first outboard airbag 13 disposed between first seat 6 and battery pack 8, and a second outboard airbag 14. First outboard airbag 13 and the second outboard airbag 14 are each deployable from a packed position to or between an inflated position. First outboard airbag 13 is configured to deploy and occupy a space at least partially between the first seat 6 and first side 4 of body 2. First outboard airbag 13 accordingly is disposed within vehicle 1 in its packed position in order to accommodate such a deployment capability. For example, first outboard airbag 13 can be disposed on floor 15, within floor 15, on base 6B, within base 6B, proximate to base 6B, and/or between first seat 6 and first side 4 of body 2. Upon deployment, first outboard airbag 13 may achieve contiguity with first side 4 of body 2. Similarly, second outboard airbag 14 is configured to deploy and occupy a space at least partially between the second seat 7 and second side 5 of body 2. Second outboard airbag 14 accordingly is disposed within vehicle 1 in its packed position in order to accommodate such a deployment capability. For example, first outboard airbag 13 can be disposed on floor 15, within floor 15, on base 7B, within base 7B, proximate to base 7B, and/or between second seat 7 and second side 5 of body 2. Upon deployment, second outboard airbag 14 may achieve contiguity with second side 5 of body 2.

In general, first inboard airbag 11, first outboard airbag 13, second inboard airbag 12, and second outboard airbag 14 (collectively "the Airbags") comprise an inflatable bag or member capable of containing a fluid (e.g., air or compress gas), and an actuator capable of deploying, or initiating the deployment, of the airbag from a packed position to or between an inflated position. For example, an actuator may include an igniter and a pyrotechnic device configured to ignite and fill the inflatable bag with gas (e.g., air) when desired. In a packed position, each of the Airbags' inflatable bag is stored in a folded or otherwise specially compressed position, and, as is known in the art, can occur within an outer package configured to protect or isolate the airbag while packed, and allow deployment thereof as desired. The inflatable bag can comprise any suitable material as are known in the art, such as a fibrous materials, fabrics, or other like material(s).

First inboard airbag 11 and second inboard airbag 12, and optionally further comprising first outboard airbag 13 and second outboard airbag 14 are provided within vehicle 1 in order to prevent or minimize damage to battery pack 8 during traumatic events such as a vehicle collision. Accordingly, vehicle 1 may comprise a first sensor 16 and a second sensor 17. First sensor 16 can be disposed proximate the first side 4 of vehicle 1, and second sensor 17 can be disposed proximate the second side 5 of vehicle 1. In particular, first sensor 16 can be disposed proximate first seat 6 outboard side 60B, and second sensor 17 can be disposed proximate second seat 7 outboard side 70B. For example, first sensor 16 and second sensor 17 can be disposed on or within vehicle body 2, floor 15, and/or base 6B and base 7B, respectively, in order to achieve the aforementioned configurations. In some embodiments, first sensor 16 and second sensor 17 are disposed such that they may detect or predict traumatic events (e.g., collisions) proximate or to vehicle 1 first side 4 and vehicle 1 second side 5, respectively. In particular, first sensor 16 and second sensor 17 are disposed to detect or predict the occurrence of traumatic events that may or will cause the position(s) of first seat 6 and/or second seat 7 to be undesirably adjusted towards battery pack 8. First sensor 16 and second sensor 17 may comprise accelerometers, impact sensors, side pressure sensors, or other suitable sensors. In a particular embodiment, first sensor 16 and second sensor 17 comprise accelerometers. In addition to or as an alternative to, other sensors may be utilized to detect or predict the occurrence of a traumatic event, including vehicle speed sensors, brake pedal sensors, seat occupancy sensors, and temperature sensors, among others.

Airbags can require external activation, such as in response to a collision or imminent collision. As shown, first sensor 16 and second sensor 17 ("the Sensors") are operatively connected to an electronic control module (ECM) 20. Similarly, the Airbags may be operatively connected to ECM 20. In some embodiments, ECM 20 may be operatively connected to each of the Airbags via the Airbags' respective actuators. The Sensors and the Airbags can be operatively connected to ECM 20 via wired, wireless means, among others. As used herein, the term ECM refers to an application specific integrated circuit (ASIC), an electronic circuit, a processor (shared, dedicated, or group) and/or memory that executes one or more software or firmware programs, a combinational logic circuit, and/or other suitable components that provide the described functionality. Accordingly, the Airbags are operatively connected to one or more of the Sensors via ECM 20. In other embodiments, the Airbags can be directly operatively connected to one or more of the Sensors (i.e., without ECM 20). In some embodiments, an actuator of a respective airbag can be connected to ECM 20 or one or more of the Sensors.

ECM 20 can initiate the deployment of one or more of the Airbags during, prior to, or in response to a deployment event. The Sensors can generate one or more signals and transmit the same to the ECM 20, wherein the ECM 20 can utilize logic to determine whether a deployment event has occurred, is occurring, or will occur. In response thereto, ECM 20 can deploy one or more of the airbags. A deployment event can comprise any event which may harm battery pack 8, such as a vehicle rollover, collision, or an imminent collision, for example. One or more of the Airbags can be deployed in order to protect or minimize damage to battery pack 8. In some embodiments, the first inboard airbag 11 and the second inboard airbag 12 can be deployed simultaneously. In some embodiments, first inboard airbag 11 second inboard airbag 12, first outboard airbag 13, and second outboard airbag 14 can be deployed simultaneously. In some embodiments wherein vehicle 1 comprises first inboard airbag 11 and second inboard airbag 12, and optionally further comprising first outboard airbag 13 and second outboard airbag 14, the Airbags can be deployed non-simultaneously, for example in response to a particular characteristic of a deployment event. For example, a collision detected on vehicle 1 first side 4 may deploy first inboard airbag 11 and first outboard airbag 13, and subsequently deploy second inboard airbag 12 and second outboard airbag 14. Similarly, in some embodiments, first inboard airbag 11 and second inboard airbag 12 may deploy prior to first outboard airbag 13 and second outboard airbag 14.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle comprising:
a vehicle body defining a cabin and having a floor, a first side and a second side;
a first seat having a base and a second seat having a base disposed within the cabin, wherein each of the first seat and the second seat comprise an inboard side and an outboard side and the first seat is biased towards the first side of the vehicle and the second seat is biased towards the second side of the vehicle;
a battery pack disposed at least partially between the first seat and the second seat;
a first inboard airbag disposed on the floor, within the floor, within the first seat base, or between the first seat base and the battery pack;
a first outboard airbag;
a second inboard airbag disposed on the floor, within the floor, within the second seat base, or between the second seat base and the battery pack; and
a second outboard airbag,
wherein the first inboard airbag, the first outboard airbag, the second inboard airbag, and the second outboard airbag are each deployable from a packed position to or between an inflated position in order to protect the battery pack or minimize damage to the battery pack, and the first inboard airbag is configured to deploy and occupy a space at least partially between the first seat base and the battery pack, the first outboard airbag is configured to deploy and occupy a space at least partially between the first seat and the first side of the vehicle body, the second inboard airbag is configured to deploy and occupy a space at least partially between the second seat base and the battery pack, and the second outboard airbag is configured to deploy and occupy a space at least partially between the second seat and the second side of the vehicle body, and wherein the first inboard airbag and the second inboard airbag are configured to, in response to detecting a vehicle collision, deploy prior to the first outboard airbag and the second outboard airbag.

2. The vehicle of claim 1, wherein the first inboard airbag is disposed on or in the first seat, the first outboard airbag is disposed on or in the first seat, the second inboard airbag is disposed on or in the second seat, and/or the second outboard airbag is disposed on or in the second seat.

3. The vehicle of claim 1, further comprising a first sensor disposed proximate the first seat outboard side and a second sensor disposed proximate the second seat outboard side, wherein the first sensor and the second sensor each comprise an accelerometer.

4. The vehicle of claim 3, wherein the first inboard airbag, the first outboard airbag, the second inboard airbag, and the second outboard airbag each comprise an actuator, and each respective actuator is operatively connected with at least one of the first sensor and the second sensor.

5. The vehicle of claim 4, wherein the first inboard airbag actuator, the first outboard airbag actuator, the second inboard airbag actuator, and the second outboard airbag actuator are operatively connected with at least one of the first sensor and the second sensor via an electronic control module.

6. The vehicle of claim 1, wherein the vehicle is an electric vehicle or hybrid electric vehicle at least partially powered by the battery pack.

7. A vehicle comprising:
a vehicle body defining a cabin and having a floor, a first side and a second side;
a first seat having a base and a second seat having a base disposed within the cabin and generally transverse a direction of movement of the vehicle, wherein each of the first seat and the second seat comprise an inboard side and an outboard side;
a battery pack disposed at least partially between the first seat and the second seat and configured to deliver power to a driveline of the vehicle;
a first sensor disposed proximate the first seat outboard side;
a second sensor disposed proximate the second seat outboard side;
an electronic control module (ECM) operatively connected to the first sensor and the second sensor;
a first inboard airbag disposed on the floor, within the floor, within the first seat base, or between the first seat and the battery pack and including an actuator operatively connected to the ECM;
a first outboard airbag disposed between the first seat and the vehicle body and including an actuator operatively connected to the ECM;
a second inboard airbag disposed on the floor, within the floor, within the second seat base, or between the second seat and the battery pack and including an actuator operatively connected to the ECM; and
a second outboard airbag disposed between the second seat and the vehicle body and including an actuator operatively connected to with the ECM;
wherein the first inboard airbag and the second inboard airbag are each deployable from a packed position to or between an inflated position in order to protect the battery pack or minimize damage to the battery pack, and the first inboard airbag is configured to deploy and occupy a space at least partially between the first seat base and the battery pack and the second inboard airbag is configured to deploy and occupy a space at least partially between the second seat base and the battery pack, and wherein the first inboard airbag and the first outboard airbag are configured to, in response to detecting a collision on the vehicle first side, deploy prior to the second inboard airbag and the second outboard airbag.

8. The vehicle of claim 7, wherein the first inboard airbag and the second inboard airbag are capable of deploying to a position contiguous with the battery pack.

9. The vehicle of claim 7, wherein one or more of the first inboard airbag, the first outboard airbag, the second inboard airbag, and the second outboard airbag are configured to deploy in response to a deployment event.

10. The vehicle of claim 9, wherein the occurrence of a deployment event is determined by the ECM based on one or more signals received from the first sensor and/or the second sensor.

11. The vehicle of claim 7, wherein the first sensor and the second sensor each comprise an accelerometer.

12. The vehicle of claim 7, wherein the first inboard airbag and the first outboard airbag are mounted to the base of the first seat, and the second inboard airbag and the second outboard airbag are mounted to the base of the second seat.

* * * * *